(12) United States Patent
Perisic et al.

(10) Patent No.: US 7,990,098 B2
(45) Date of Patent: Aug. 2, 2011

(54) SERIES-COUPLED TWO-MOTOR DRIVE USING DOUBLE-ENDED INVERTER SYSTEM

(75) Inventors: Milun Perisic, Torrance, CA (US); Silva Hiti, Redondo Beach, CA (US); Gregory S. Smith, Woodland Hills, CA (US); James M. Nagashima, Cerritos, CA (US); George John, Cerritos, CA (US); Sibaprasad Chakrabarti, Torrance, CA (US); Brian A. Welchko, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 453 days.

(21) Appl. No.: 12/113,710

(22) Filed: May 1, 2008

(65) Prior Publication Data

US 2009/0033251 A1 Feb. 5, 2009

Related U.S. Application Data

(60) Provisional application No. 60/952,740, filed on Jul. 30, 2007.

(51) Int. Cl.
*H02P 27/04* (2006.01)
(52) U.S. Cl. .......... 318/801; 318/800; 318/432; 363/40; 363/55
(58) Field of Classification Search .................. 318/800, 318/801, 244, 700, 432, 434, 437, 705, 727, 318/799, 400.01, 400.02, 689; 363/15, 34, 363/40, 55, 56.05, 71, 170
See application file for complete search history.

(56) References Cited

U.S. PATENT DOCUMENTS 5,352,964 A 10/1994 Nakamura et al.
(Continued)

FOREIGN PATENT DOCUMENTS

CN 1102919 A 5/1995
(Continued)

OTHER PUBLICATIONS

Singh, G.K., "Multi-Phase Induction Machine Drive Research—A Survey," Elsevier Science B.V., Electric Power Systems Research, 2002, pp. 139-147.

(Continued)

*Primary Examiner* — Walter Benson
*Assistant Examiner* — Antony M Paul
(74) *Attorney, Agent, or Firm* — Ingrassia Fisher & Lorenz, P.C.

(57) ABSTRACT

Systems and apparatus are provided for an inverter system for use in a vehicle. The inverter system comprises a six-phase motor having a first set of three-phase windings and a second set of three-phase windings and a three-phase motor having a third set of three-phase windings, wherein the third set of three-phase windings is coupled to the first set of three-phase windings and the second set of three-phase windings. The system further comprises a first energy source coupled to a first inverter adapted to drive the six-phase motor and the three-phase motor, wherein the first set of three-phase windings is coupled to the first inverter, and a second energy source coupled to a second inverter adapted to drive the six-phase motor and the three-phase motor, wherein the second set of three-phase windings is coupled to the second inverter. A controller is coupled to the first inverter and the second inverter.

8 Claims, 5 Drawing Sheets

U.S. PATENT DOCUMENTS

| | | | |
|---|---|---|---|
| 5,389,749 | A | 2/1995 | Hokari et al. |
| 5,514,944 | A * | 5/1996 | Miyazaki ..................... 318/800 |
| 5,705,909 | A | 1/1998 | Rajashekara |
| 6,067,237 | A | 5/2000 | Nguyen |
| 6,236,583 | B1 | 5/2001 | Kikuchi et al. |
| 6,291,963 | B2 * | 9/2001 | Nakano ........................ 318/801 |
| 6,510,063 | B2 * | 1/2003 | Kobayashi et al. ............. 363/41 |
| 6,630,804 | B2 * | 10/2003 | Moriya et al. ................... 318/85 |
| 6,676,400 | B2 * | 1/2004 | Ito ................................. 425/145 |
| 6,759,818 | B2 | 7/2004 | Oyori |
| 7,099,756 | B2 * | 8/2006 | Sato ............................... 701/22 |
| 7,130,205 | B2 | 10/2006 | Peng |
| 7,154,237 | B2 | 12/2006 | Welchko et al. |
| 7,199,535 | B2 * | 4/2007 | Welchko et al. ............. 318/105 |
| 7,259,530 | B2 * | 8/2007 | Ochiai et al. ................. 318/105 |
| 7,276,865 | B2 * | 10/2007 | Ochiai ............................ 318/34 |
| 7,294,984 | B2 | 11/2007 | Urakabe et al. |
| 7,372,712 | B2 * | 5/2008 | Stancu et al. ................... 363/71 |
| 7,439,697 | B2 | 10/2008 | Miyazaki et al. |
| 2002/0105300 | A1 | 8/2002 | Moriya et al. |
| 2007/0069673 | A1 | 3/2007 | Oyobe et al. |
| 2007/0120520 | A1 | 5/2007 | Miyazaki et al. |
| 2007/0274109 | A1 | 11/2007 | Oyobe et al. |
| 2009/0127948 | A1 | 5/2009 | Shimizu et al. |
| 2009/0128076 | A1 | 5/2009 | Taniguchi |
| 2010/0116571 | A1 | 5/2010 | Suzuki |
| 2010/0181829 | A1 | 7/2010 | Ichikawa et al. |

FOREIGN PATENT DOCUMENTS

| | | |
|---|---|---|
| CN | 1946587 A | 4/2007 |
| EP | 1808958 A2 | 7/2007 |

OTHER PUBLICATIONS

Peng, Fang Zheng, "Z-Source Inverter," IEEE Transactions on Industry Applications, Mar./Apr. 2003, vol. 39, No. 2, pp. 504-510.

Jones, Martin et al., "A Six-Phase Series-Connected Two-Motor Drive With Decoupled Dynamic Control," IEEE Transactions on Industry Applications, Jul./Aug. 2005, vol. 41, No. 4, pp. 1056-1066.

Welchko, Brian A., "A Double-Ended Inverter System for the Combined Propulsion and Energy Management Functions in Hybrid Vehicles with Energy Storage," The 31st Annual Conference of the IEEE Industrial Electronics Society, IECON '05, Raleigh, North Carolina, Nov. 6-10, 2005, pp. 1-6.

Levi, Emil et al., "A Series-Connected Two-Motor Six-Phase Drive With Induction and Permanent Magnet Machines," IEEE Transactions on Energy Conversion, Mar. 2006, vol. 21, No. 1, pp. 121-129.

Li, S., et al. "Design of Six-phase Induction Motor Vector Control System Based on DSP—Large Electric Machine and and Hydraulic Turbine," Turbine Technology, Jun. 2005, pp. 23-26, vol. 3.

Chinese Office Action issued Jul. 29, 2010, for Application No. 20081021523.

Office Action date Aug. 5, 2010, issued in U.S. Appl. No. 12/110,946.

Office Action mailed Nov. 29, 2010, issued in U.S. Appl. No. 12/110,946.

Chinese Office Action dated Sep. 3, 2010, issued in Application No. 200810214793.1.

* cited by examiner

US 7,990,098 B2

SERIES-COUPLED TWO-MOTOR DRIVE USING DOUBLE-ENDED INVERTER SYSTEM

CROSS-REFERENCE TO RELATED APPLICATION(S)

This application claims the benefit of U.S. provisional patent application Ser. No. 60/952,740, filed Jul. 30, 2007.

TECHNICAL FIELD

Embodiments of the subject matter described herein relate generally to vehicle drive systems, and more particularly, embodiments of the subject matter relate to hybrid vehicles having a double-ended inverter drive system.

BACKGROUND

In recent years, advances in technology, as well as ever evolving tastes in style, have led to substantial changes in the design of automobiles. One of the changes involves the power usage and complexity of the various electrical systems within automobiles, particularly alternative fuel vehicles, such as hybrid, electric, and fuel cell vehicles.

Many of the electrical components, including the electric motors used in such vehicles, receive electrical power from alternating current (AC) power supplies. However, the power sources (e.g., batteries) used in such applications provide only direct current (DC) power. Thus, devices known as "power inverters" are used to convert the DC power to AC power, which often utilize several of switches, or transistors, operated at various intervals to convert the DC power to AC power.

Additionally, such vehicles, particularly fuel cell vehicles, often use two separate voltage sources (e.g., a battery and a fuel cell) to power the electric motors that drive the wheels. "Power converters," such as direct current-to-direct current (DC/DC) converters, are typically used to manage and transfer the power from the two voltage sources. Modern DC/DC converters often include transistors electrically interconnected by an inductor. By controlling the states of the various transistors, a desired average current can be impressed through the inductor and thus control the power flow between the two voltage sources.

The utilization of both a power inverter and a power converter greatly increases the complexity of the electrical system of the automobile. The additional components required for both types of devices also increase the overall cost and weight of the vehicle. Accordingly, systems and methods have been developed for operating a motor coupled to multiple power sources without a DC/DC converter while maximizing the performance of the motor by utilizing dual inverter electrical systems.

Traditional automotive systems include electrical systems designed for three-phase motors. However, multi-phase motor drives with more than three phases operate with improved efficiency and reduce the required inverter per-phase power rating. In some cases, this may result in cheaper and more compact power inverters in addition to improved motor performance. Additionally, multi-phase motor drives with at least five or more phases may be configured in series in an appropriate manner with another motor drive, thereby reducing the number of power inverters required in a system while providing independent control of both motors.

Accordingly, it is desirable to provide systems and methods for operating a series-coupled two-motor drive using a dual inverter system coupled to two separate energy sources. Other desirable features and characteristics of the present invention will become apparent from the subsequent detailed description and the appended claims, taken in conjunction with the accompanying drawings and the foregoing technical field and background

BRIEF SUMMARY

An apparatus is provided for an automotive drive system. The automotive drive system comprises a series-coupled two-motor drive comprising a first motor having a first set of windings and a second set of windings, and a second motor having a third set of windings, wherein the third set of windings is coupled to the first set of windings and the second set of windings. A first inverter is coupled to the first set of windings and a second inverter coupled to the second set of windings.

An apparatus is provided for an inverter system for use in a vehicle having a first energy source and a second energy source. The inverter system comprises a six-phase motor having a first set of three-phase windings and a second set of three-phase windings and a three-phase motor having a third set of three-phase windings, wherein the third set of three-phase windings is coupled to the first set of three-phase windings and the second set of three-phase windings. A first inverter is coupled to the first energy source and is adapted to drive the six-phase motor and the three-phase motor, wherein the first set of three-phase windings is coupled to the first inverter. A second inverter is coupled to the second energy source and is adapted to drive the six-phase motor and the three-phase motor, wherein the second set of three-phase windings is coupled to the second inverter. A controller is coupled to the first inverter and the second inverter and may be configured to control the first inverter and the second inverter in order to achieve desired power flow between the first energy source, the second energy source, the six-phase motor, and the three-phase motor.

A method is provided for controlling a six-phase motor and a three-phase motor coupled in series using a double-ended inverter system comprising a first inverter and a second inverter. In response to determining a first motor current corresponding to a commanded torque in the six-phase motor and a second motor current corresponding to a commanded torque in the three-phase motor, the method comprises determining a first current based on the first motor current for each phase of the six-phase motor being driven by the first inverter and the second motor current for each phase of the three-phase motor. The method further comprises determining a second current based on the first motor current for each phase of the six-phase motor being driven by the second inverter and the second motor current for each phase of the three-phase motor, and adjusting the voltage output of the double-ended inverter system to produce the first current in the first inverter and the second current in the second inverter.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics shown herein depict exemplary arrangements of elements, additional intervening elements, devices, features, or components may be present in an embodiment of the depicted subject matter. The terms "first", "second" and other such numerical terms referring to structures do not imply a sequence or order unless clearly indicated by the context.

Figure 1:
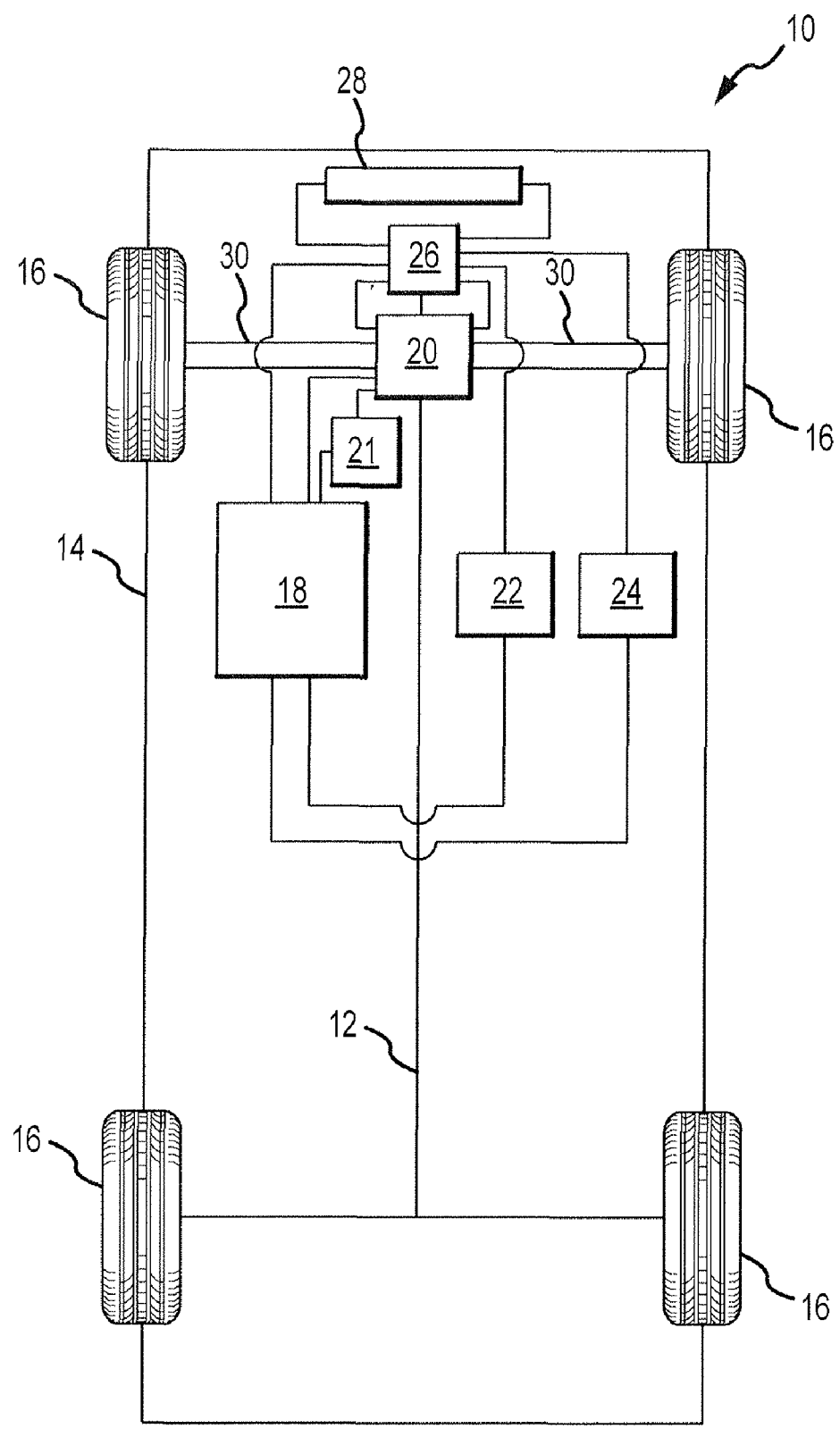
FIG. 1 is a schematic view of an exemplary automobile in accordance with one embodiment.

FIG. 1 illustrates a vehicle, or automobile 10, according to one embodiment of the present invention. The automobile 10 includes a chassis 12, a body 14, four wheels 16, and an electronic control system 18. The body 14 is arranged on the chassis 12 and substantially encloses the other components of the automobile 10. The body 14 and the chassis 12 may jointly form a frame. The wheels 16 are each rotationally coupled to the chassis 12 near a respective corner of the body 14.

The automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 10 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and natural gas) fueled engine, a combustion/electric motor hybrid engine, and an electric motor.

In the exemplary embodiment illustrated in FIG. 1, the automobile 10 further includes a first motor 20 (i.e., an electric motor/generator, traction motor, etc.), a first energy source 22, a second energy source 24, a power inverter assembly 26, and a radiator 28. The radiator 28 is connected to the frame at an outer portion thereof and although not illustrated in detail, includes multiple cooling channels that contain a cooling fluid (i.e., coolant), such as water and/or ethylene glycol (i.e., "antifreeze"), and is coupled to the power inverter assembly 26 and the first motor 20. In one embodiment, the power inverter assembly 26 receives and shares coolant with the first motor 20. As shown in FIG. 1, the first motor 20 may also include a transmission integrated therein such that the first motor 20 and the transmission are mechanically coupled to at least some of the wheels 16 through one or more drive shafts 30.

As shown, the first energy source 22 and the second energy source 24 are in operable communication and/or electrically coupled to the electronic control system 18 and the power inverter assembly 26. Although not illustrated, the first energy source 22 and the second energy source 24 may vary depending on the embodiment and may be of the same or different type. In one or more embodiments, the first energy source 22 and second energy source 24 may each comprise a battery, a fuel cell, an ultracapacitor, or another suitable voltage source. A battery may be any type of battery suitable for use in a desired application, such as a lead acid battery, a lithium-ion battery, a nickel-metal battery, or another rechargeable battery. An ultracapacitor may comprise a supercapacitor, an electrochemical double layer capacitor, or any other electrochemical capacitor with high energy density suitable for a desired application.

The automobile 10 further includes a second motor 21 which is coupled to the first motor 20 in series by configuring the stator windings of the motors 20 and 21 in an appropriate manner. In an exemplary embodiment, the second motor 21 is a low power auxiliary motor having a power rating approximately 10% of the power rating of the first motor 20. Using a second motor 21 with a considerably smaller power rating than the first motor 20 reduces stator winding losses in the first motor 20 which are a natural result of the series configuration. Although the second motor 21 may have a power rating ratio greater than 10%, the stator winding losses could increase to a point where the series-coupled motor drive becomes impractical.

Figure 2:
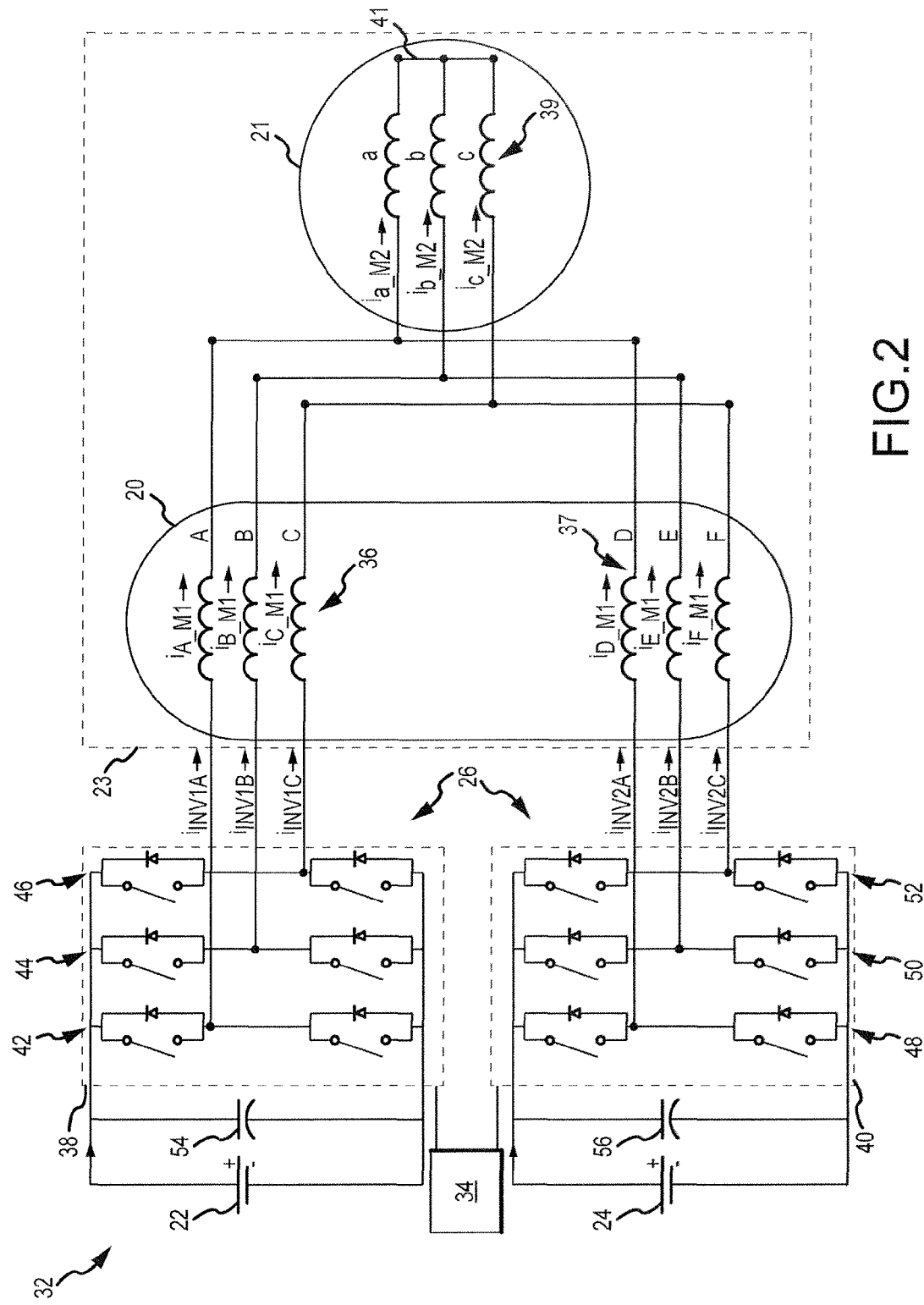
FIG. 2 is a schematic view of a double-ended inverter system in accordance with one embodiment.

Referring now to FIGS. 1 and 2, a double-ended inverter system 32 may be adapted to drive a series-coupled two-motor drive 23 within the automobile 10 in accordance with one embodiment. The double-ended inverter system 32 includes the first motor 20, the second motor 21, the first energy source 22, the second energy source 24, the power inverter assembly 26, and a controller 34.

In an exemplary embodiment, the first motor 20 is a multi-phase alternating current (AC) motor and includes a first set of windings 36 (or coils) and a second set of windings 37, wherein each winding corresponds to one phase of the first motor 20. Although not illustrated, the first motor 20 includes a stator assembly (including the coils), a rotor assembly (including a ferromagnetic core), and a cooling fluid (i.e., coolant), as will be appreciated by one skilled in the art. The first motor 20 may be an induction motor, a permanent magnet motor, or any type suitable for the desired application.

In an exemplary embodiment, the first motor 20 is a six-phase motor, with the first set of windings 36 (phases A-C) and the second set of windings 37 (phases D-F) each corresponding to three-phase wiring structures. The second motor 21 is a three-phase motor with a third set of windings 39 corresponding to a three-phase wiring structure (phases a-c). The connection of the windings 36, 37 and 39 may vary depending on the desired application and can be extended out to accommodate additional phases in the motors 20 and 21 as will be appreciated in the art.

In an exemplary embodiment, the series-coupled two-motor drive 23 is created by connecting phases A and D of the first motor 20 which are coupled to phase a of the second motor 21, connecting phases B and E of the first motor 20 which are coupled to phase b of the second motor 21, and connecting phases C and F of the first motor 20 which are coupled to phase c of the second motor 21. In accordance with one embodiment, the third set of windings 39 may be configured as a wye connection by connecting the ends of phases a, b, and c which are not coupled to the first motor 20 to create a neutral point 41. The connections of the windings 36 and 37 (phases A and D, B and E, C and F) may be connected internally in order to reduce the number of stator terminals on the first motor 20.

Figure 3:
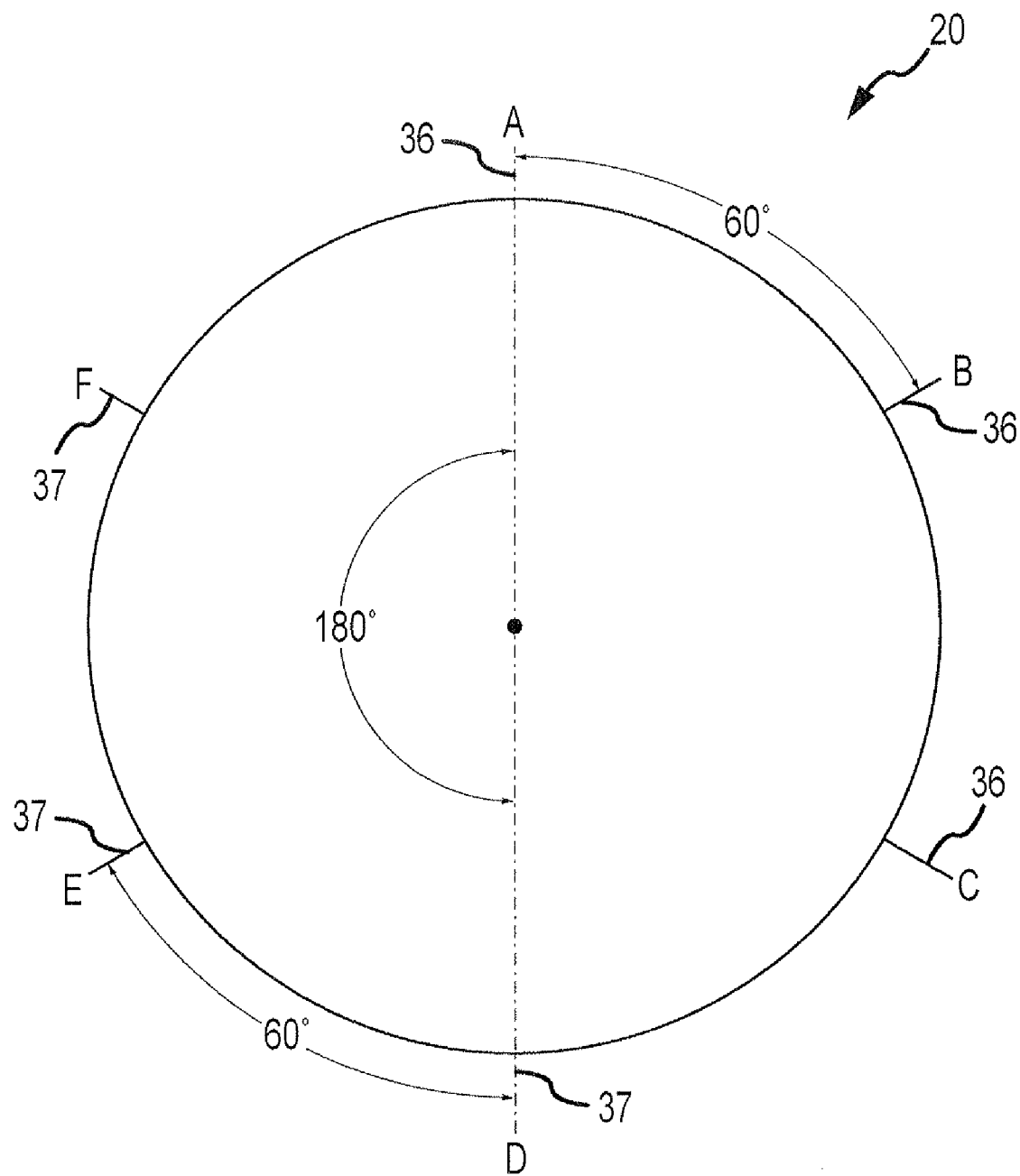
FIG. 3 is a schematic view of a stator winding configuration of a first motor for use in the double-ended inverter system of FIG. 2 in accordance with one embodiment.

Referring now to FIG. 3, the spatial arrangement of the windings 36, 37, and 39 within the motors 20 and 21 may very depending on the design. In an exemplary embodiment, the first motor 20 and second motor 21 are both symmetrical. In an exemplary embodiment, where the first motor 20 is a six-phase symmetrical motor, the spatial displacement between any two consecutive stator phases is 60°. In this case, phases A and D are displaced by 180°, such that when the motor 20 is coupled as in FIG. 2, the flux/torque producing current flowing through phase A ($i_{A\_M1}$) returns through phase D ($i_{D\_M1}$) and therefore will not flow to the second motor 21 (i.e., the currents cancel at the point of connection and do not flow to phase a). This also applies for the other phases (B and E, C and F) which are also displaced by 180°. The result of this configuration is that the torque producing current in the first motor 20 does not flow through the second motor 21. The second motor 21 may be a symmetrical three-phase motor, such that the displacement between consecutive stator phases is 120° as is understood in the art.

Referring again to FIG. 2, the power inverter assembly 26 includes a first inverter 38 and a second inverter 40, each including six switches (e.g., semiconductor devices, such as transistors and/or switches) with antiparallel diodes (i.e., antiparallel to each switch). As shown, the switches in the inverters 38 and 40 are arranged into three legs (or pairs), with legs 42, 44, and 46 being in the first inverter 38 and legs 48, 50, and 52 being in the second inverter 40.

In an exemplary embodiment, the first phase (A) of the first set of windings 36 of the first motor 20 is electrically connected between the switches of switch leg 42 in the first inverter 38. The second phase (B) of the first set of windings 36 is connected between the switches of leg 44 in the first inverter 38 and the third phase (C of the first set of windings 36 is connected between the switches of leg 46. Similarly, the phases (D, E, and F) of the second set of windings 37 may be connected between the switches of legs 48, 50, and 52 as shown.

In this configuration, energy sources 22 and 24 with different voltage levels, power ratings, operating characteristics, etc. may be used simultaneously. This is particularly advantageous compared to other inverter systems where, as a practical matter, the energy sources 22 and 24 are required to be nearly identical. For example, in this case, a high voltage source ($\geqq 100V$) may be used simultaneously with a 12 V battery to drive the series-coupled two-motor drive 23. However, in an exemplary embodiment, the energy sources 22 and 24 have similar voltage levels in order to achieve optimal control of the current in the system. The series-coupled two-motor drive 23 eliminates the need for a third inverter to drive the second motor 21.

Still referring to FIG. 2, the double-ended inverter system 32 may also include first and second capacitors 54 and 56 respectively connected in parallel with the first and second energy sources 22 and 24 to smooth current ripple during operation. The controller 34 is in operable communication and/or electrically coupled to the first and second inverters 38 and 40. The controller 34 is responsive to commands received from the driver of the automobile 10 (i.e. via an accelerator pedal) and provides commands to the first inverter 38 and the second inverter 40, as will be described, to control the output of the inverters 38 and 40.

Referring again to FIG. 1, the electronic control system 18 is in operable communication with the first motor 20, the second motor 21, the first energy source 22, the second energy source 24, and the power inverter assembly 26. Although not shown in detail, the electronic control system 18 may include various sensors and automotive control modules, or electronic control units (ECUs), such as an inverter control module (i.e., the controller 34 shown in FIG. 2) and a vehicle controller, and at least one processor and/or a memory which includes instructions stored thereon (or in another computer-readable medium) for carrying out the processes and methods as described below.

In an exemplary embodiment, during operation, the automobile 10 is operated by providing power to the wheels 16 with the first motor 20 which receives power from the first energy source 22 and the second energy source 24 in an alternating manner and/or with the first energy source 22 and the second energy source 24 simultaneously. In order to power the first motor 20, DC power is provided from the first energy source 22 and the second energy source 24 to the first and second inverters 38 and 40 respectively, which convert the DC power into AC power, as is commonly understood in the art. The first and second inverters 38 and 40 produce AC voltages across the windings 36 and 37 (or phases). As is commonly understood, the required voltages across the windings 36 and 37 of the first motor 20 (FIG. 2) are dependent on the speed, commanded torque (i.e., commanded synchronous frame currents), and other motor parameters.

In an exemplary embodiment, the second motor 21 operates independently of the first motor 20 as an auxiliary low-power motor. The energy sources 22 and 24 and inverters 38 and 40 also power the second motor 21 based upon the speed, commanded torque (i.e., commanded synchronous frame currents), and other motor parameters as described below.

Figure 4:
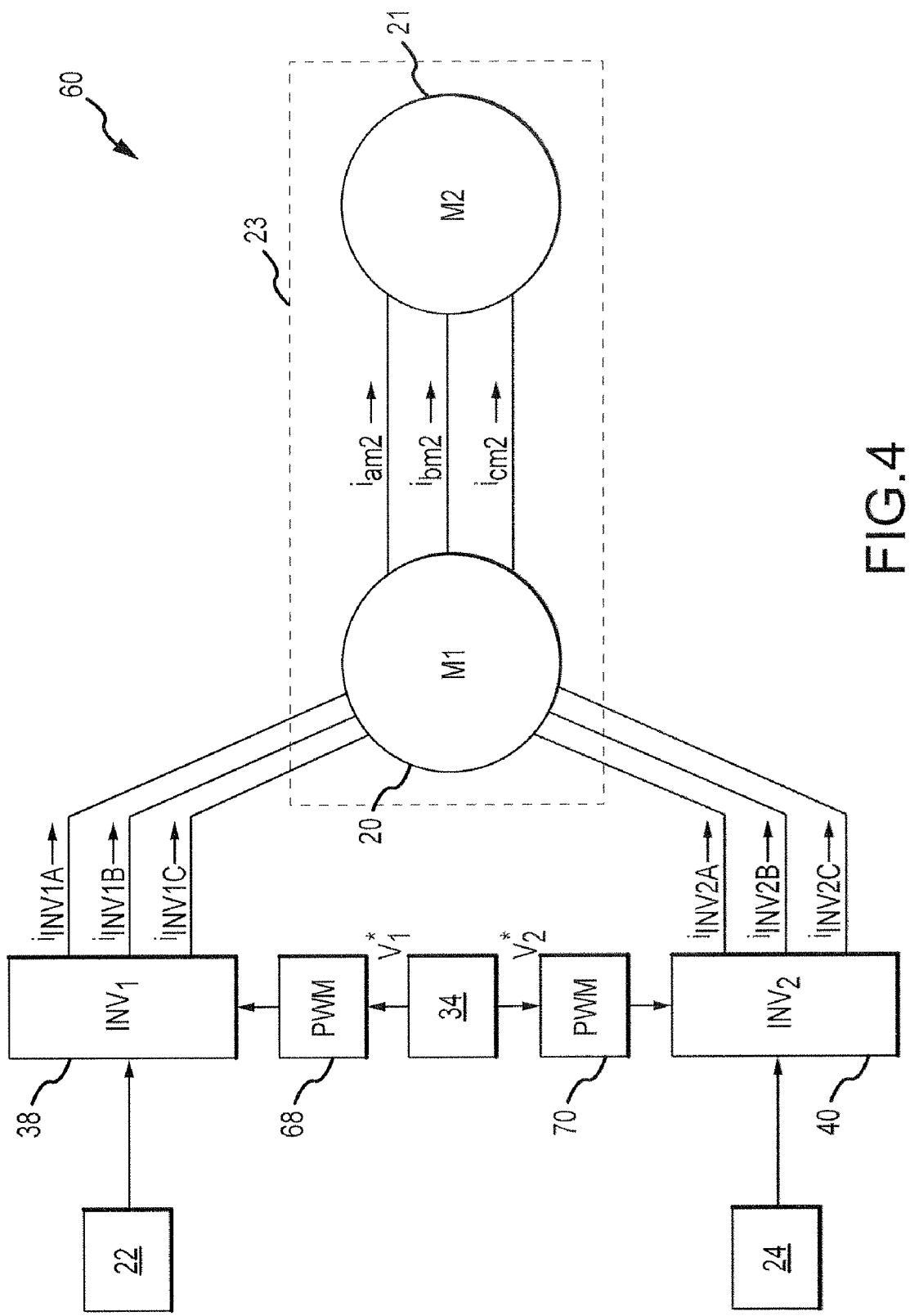
FIG. 4 is a schematic view of a control system for operating the double-ended inverter system of FIG. 2 in accordance with one embodiment.

FIG. 4 illustrates a control system 60 for operating a series-coupled two-motor drive 23 using a double-ended inverter system 32 in accordance with one embodiment. High frequency pulse width modulation (PWM) may be employed by the controller 34 to modulate and control the inverters 38 and 40 and manage the voltage produced by the inverters 38 and 40. The control system 60 includes first and second PWM blocks 68 and 70, and the double-ended inverter system 32. The controller 34 provides a control algorithm that achieves desired power flow between the first and second energy sources 22 and 24 while producing the commanded torque inside the motors 20 and 21. Although not shown, the control system 60 receives a torque command for the first motor 20 from which the controller 34 may determine power commands for the first energy source 22 (and/or the first inverter 38) and the second energy source 24 (and/or the second inverter 40), as well as currents for the windings 36 and 37 within the first motor 20.

Figure 5:
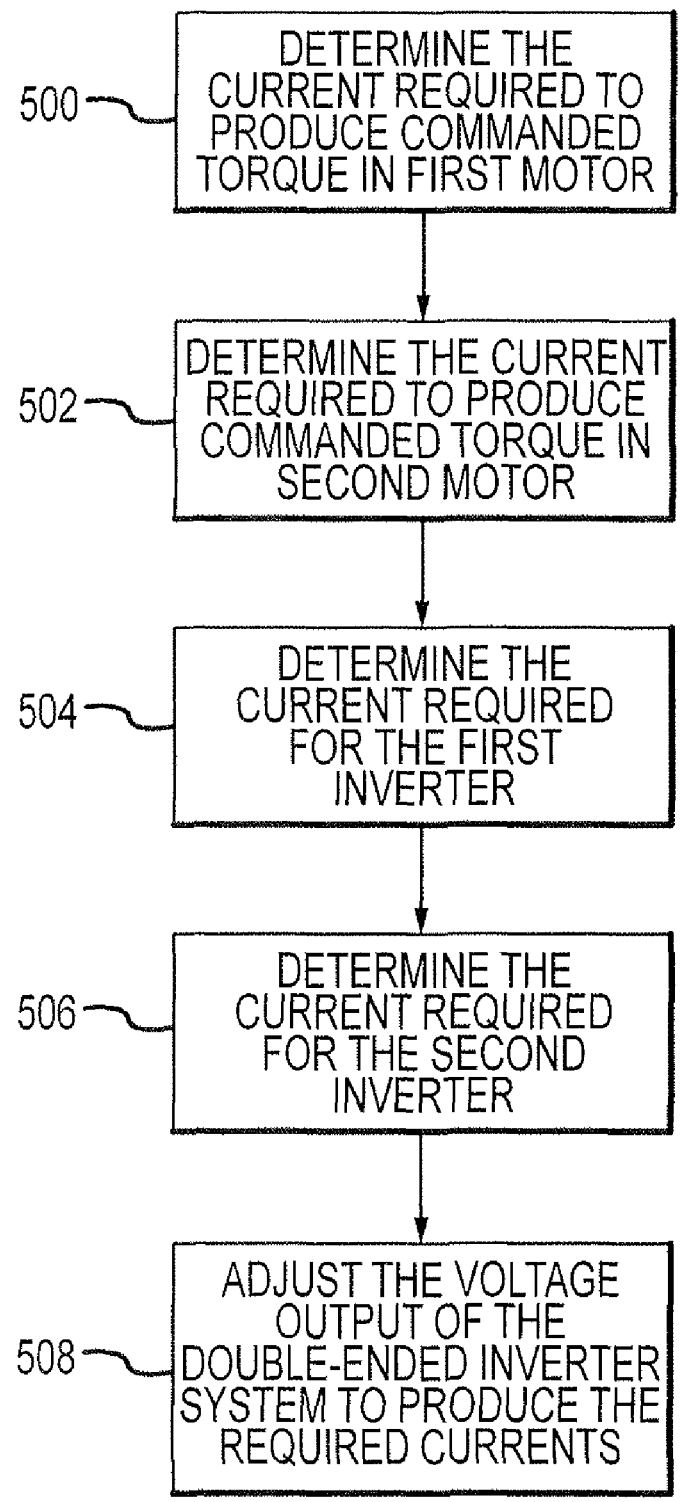
FIG. 5 is a flow chart of a control algorithm for operating a series-coupled two motor drive using a double-ended inverter system in accordance with one embodiment.

Referring now to FIG. 5, in an exemplary embodiment, the controller 34 may be configured to operate the series-coupled two-motor drive 23. The controller 34 determines the current required for each phase of the first motor 20 in order to produce the commanded torque in response to a torque command 500. The controller 34 also determines the current required for each phase of the second motor 21 in order to produce the commanded torque in response to a torque command for the second motor 21 502. In accordance with one embodiment, the respective torque commands may be provided to the controller 34 by the electronic control system 18.

Based the respective torque commands for the motors 20 and 21, the controller 34 may determine the required currents for the inverter legs 42, 44, 46, 48, 50 and 52. The current required for the first inverter 38 is determined based on the current required for each phase of the first motor 20 being driven by the first inverter 38 and the current required for each phase of the second motor 21 504. Similarly, the current required for the second inverter 40 may be determined based on the current required for each phase of the first motor 20 being driven by the second inverter 40 and the current required for each phase of the second motor 21 506.

Referring to FIGS. 2 and 5, using the configuration of the windings 36, 37 and 39 shown can enable independent and decoupled control of the first motor 20 and second motor 21 using vector control and rotor-flux-oriented control principles understood in the art. In an exemplary case, where the first motor 20 comprises six phases and the second motor 21 comprises three phases, each inverter 38 and 40 phase leg 42, 44, 46, 48, 50 and 52 current consists of the sum of current through the first motor 20 phase coupled to the respective leg 42, 44, 46, 48, 50 and 52 and a factor of the corresponding current through the second motor 21 phase coupled to the first motor 20 phase. In general, this may be determined using the following equations:

$$i_{INV1N} = i_{X\_M1} + \alpha \times i_{y\_M2}$$

$$i_{INV2N} = i_{X\_M1} + (1-\alpha) \times i_{y\_M2},$$

where $i_{INV1N}$ or $i_{INV2N}$ is the current required in a referenced inverter phase leg 42, 44, 46, 48, 50 and 52, $i_{X\_M1}$ is the current required in the phase in the first motor 20 coupled to the referenced inverter phase leg 42, 44, 46, 48, 50 and 52, $i_{y\_M2}$ is the current required in the phase in the second motor 21 coupled to the referenced phase in the first motor 20, and $\alpha$ is a constant based on the number and configuration of phases in the respective motors 20 and 21 for a given embodiment.

In an exemplary embodiment shown in FIG. 2, where the first motor 20 is a symmetrical six-phase motor and the second motor 21 is a symmetrical three-phase motor, $\alpha$ is equal to 0.5. The currents for the inverters 38 and 40 can then be determined based on the currents required for the first motor 20 and second motor 21 using the following set of equations:

$$i_{INV1A} = i_{A\_M1} + 0.5 \times i_{a\_M2} \quad i_{INV2A} = i_{D\_M1} + 0.5 \times i_{a\_M2}$$

$$i_{INV1B} = i_{B\_M1} + 0.5 \times i_{b\_M2} \quad i_{INV2B} = i_{E\_M1} + 0.5 \times i_{b\_M2}$$

$$i_{INV1C} = i_{C\_M1} + 0.5 \times i_{c\_M2} \quad i_{INV2C} = i_{F\_M1} + 0.5 \times i_{c\_M2}.$$

In accordance with one embodiment, the controller 34 may adjust the voltage output of the double-ended inverter system 32 to produce the required current in the first inverter 38 and the second inverter 40 508. Referring to FIG. 4, the controller 34 may provide the first and second PWM blocks 68 and 70 with modulating voltage signals $v^*_1$ and $v^*_2$ to generate PWM signals to operate the switches within the first and second inverters 38 and 40 to cause the desired output voltages to be applied across the windings 36 and 37 within the first motor 20, shown in FIG. 2, to operate the first motor 20 and the second motor 21 with the required torque.

As discussed above, the torque producing currents of the first motor 20 will cancel at the point of the connection and do not flow to the second motor 21. In an exemplary embodiment, the current provided to the second motor 21 is in 180° spatial displacement within the first motor 20 such that the net magnetomotive force created by this current within the first motor 20 is zero or negligible. In sum, the torque producing current for the second motor 21 does not produce flux or torque in the first motor 20, and the current producing torque in the first motor 20 sums to zero at the connection of the phases. Accordingly, control of the motors 20 and 21 may be decoupled using independent vector control or other control methods understood in the art.

One advantage of the system and/or method described above is that the electrical system used to power the first motor 20 with separate energy sources 22 and 24 is greatly simplified, as a conventional DC/DC power converter is not required. Furthermore, the system eliminates the need to for an additional inverter and/or separate control hardware/software to operate the second motor 21. Although there is an increase in stator power losses in the first motor 20, the double-ended inverter system 32 still results in improved operating efficiency when compared to using an additional inverter to drive the second motor 21, provided that the ratio of the power rating of the second motor 21 to the first motor 20 is low. As described above, the performance of the first motor 20 is not impaired as the commanded torque may still be controlled and generated within the first motor 20.

Other embodiments may utilize system and method described above in different types of automobiles, different vehicles (e.g., watercraft and aircraft), or in different electrical systems altogether, as it may be implemented in any situation where the voltages of the two sources dynamically change over a wide range. The first motor 20, the second motor 21, and the inverters 38 and 40 may have different numbers of phases, and the systems described herein should not be construed as limited to a six-phase and three-phase design. Other forms of energy sources 22 and 24 may be used, such as current sources and loads including diode rectifiers, thyristor converters, fuel cells, inductors, capacitors, and/or any combination thereof.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An inverter system for use in a vehicle having a first energy source and a second energy source comprising:
    a six-phase motor having a first set of three-phase windings and a second set of three-phase windings;
    a three-phase motor having a third set of three-phase windings, wherein the third set of three-phase windings is coupled to the first set of three-phase windings and the second set of three-phase windings;
    a first inverter coupled to the first energy source and adapted to drive the six-phase motor and the three-phase motor, wherein the first set of three-phase windings is coupled to the first inverter;
    a second inverter coupled to the second energy source and adapted to drive the six-phase motor and the three-phase motor, wherein the second set of three-phase windings is coupled to the second inverter; and
    a controller coupled to the first inverter and the second inverter, the controller being configured to control the first inverter and the second inverter to achieve desired power flow between the first energy source, the second energy source, the six-phase motor, and the three-phase motor.

2. The inverter system of claim 1, wherein the six-phase motor is a symmetrical six-phase motor.

3. The inverter system of claim 2, wherein the three-phase motor is coupled to the six-phase motor to create a series-coupled two-motor six-phase drive.

4. The inverter system of claim 3, wherein the six-phase motor has a first power rating and the three-phase motor has a second power rating, a ratio of the second power rating to the first power rating being approximately 10%.

5. The inverter system of claim 1, wherein the controller is configured to control speed and torque of the three-phase motor independently of speed and torque of the six-phase motor.

6. A method for controlling a six-phase motor and a three-phase motor coupled in series using a double-ended inverter system comprising a first inverter and a second inverter, the method comprising:
    determining a first motor current required for each phase of the six-phase motor in response to a first commanded torque for the six-phase motor;
    determining a second motor current required for each phase of the three-phase motor in response to a second commanded torque for the three-phase motor;
    determining a first current required for the first inverter based on the first motor current for each phase of the six-phase motor being driven by the first inverter and the second motor current for each phase of the three-phase motor;
    determining a second current required for the second inverter based on the first motor current for each phase of the six-phase motor being driven by the second inverter and the second motor current for each phase of the three-phase motor; and
    adjusting the voltage output of the double-ended inverter system by operating the first inverter and the second inverter to produce the first current in the first inverter and the second current in the second inverter.

7. The method of claim 6, wherein determining the first current for the first inverter is governed by the equations:

$$i_{INV1A} = i_{A\_M1} + 0.5 \times i_{a\_M2},$$

wherein $i_{A\_M1}$ is the first motor current for phase A of the six-phase motor and $i_{a\_M2}$ is the second motor current for phase a of the three-phase motor;

$$i_{INV1B} = i_{B\_M1} + 0.5 \times i_{b\_M2},$$

wherein $i_{B\_M1}$ is the first motor current for phase B of the six-phase motor and $i_{b\_M2}$ is the second motor current for phase b of the three-phase motor; and $$i_{INV1C} = i_{C\_M1} + 0.5 \times i_{c\_M2},$$

wherein $i_{C\_M1}$ is the first motor current for phase C of the six-phase motor and $i_{c\_M2}$ is the second motor current for phase c of the three-phase motor.

8. The method of claim 7, wherein determining the second current for the second inverter is governed by the equations:

$$i_{INV2A} = i_{D\_M1} + 0.5 \times i_{a\_M2},$$

wherein $i_{D\_M1}$ is the first motor current for phase D of the six-phase motor and $i_{a\_M2}$ is the second motor current for phase a of the three-phase motor;

$$i_{INV2B} = i_{E\_M1} + 0.5 \times i_{b\_M2},$$

wherein $i_{E\_M1}$ is the first motor current for phase E of the six-phase motor and $i_{b\_M2}$ is the second motor current for phase b of the three-phase motor; and $$i_{INV2C} = i_{F\_M1} + 0.5 \times i_{c\_M2},$$

wherein $i_{F\_M1}$ is the first motor current for phase F of the six-phase motor and $i_{c\_M2}$ is the second motor current for phase c of the three-phase motor.

* * * * *